(12) United States Patent
Sproule et al.

(10) Patent No.: US 9,253,018 B2
(45) Date of Patent: Feb. 2, 2016

(54) SHARING AN APPLICATION CONFIGURATION AMONG SOCIAL NETWORKS

(71) Applicant: Zynga Inc., San Francisco, CA (US)

(72) Inventors: Dylan Sproule, San Francisco, CA (US); Shane Hall, San Francisco, CA (US); Ben Hall, Fairfield, CA (US); Timothy J. O. Catlin, San Mateo, CA (US); Jason Paul Allen, Seattle, WA (US); Clayton Rhodes Stark, Victoria (CA)

(73) Assignee: Zynga Inc., San Francisco, CA (US)

( * ) Notice: Subject to any disclaimer, the term of this patent is extended or adjusted under 35 U.S.C. 154(b) by 280 days.

(21) Appl. No.: 13/780,506

(22) Filed: Feb. 28, 2013

(65) Prior Publication Data

US 2013/0232199 A1    Sep. 5, 2013

Related U.S. Application Data

(60) Provisional application No. 61/605,917, filed on Mar. 2, 2012, provisional application No. 61/605,602, filed on Mar. 1, 2012.

(51) Int. Cl.
*H04L 29/08* (2006.01)
*H04L 29/06* (2006.01)

(52) U.S. Cl.
CPC ............ *H04L 29/0899* (2013.01); *H04L 67/36* (2013.01); *H04L 67/38* (2013.01)

(58) Field of Classification Search
CPC .............. H04L 67/104; H04L 12/1813; H04L 43/0876; H04L 67/36; H04L 67/38; H04L 29/0899; G06Q 50/01; G06Q 30/0255; G06F 17/30867; H04W 12/06
USPC ......................................................... 709/204
See application file for complete search history.

(56) References Cited

U.S. PATENT DOCUMENTS

2008/0045335 A1*  2/2008  Garbow et al. ............... 463/29
2008/0268947 A1* 10/2008  Fyock et al. .................. 463/29

(Continued)

OTHER PUBLICATIONS

"Social gaming giant Zynga released HTML5 cross-platform game 3", ixwebhosting (http://www.ixwebhosting.mobi/social-gaming-giant-zynga-released-html5-cross-platform-game-3/), accessed Oct. 15, 2011, 3.

(Continued)

*Primary Examiner* — Larry Donaghue
(74) *Attorney, Agent, or Firm* — Schwegman Lundberg & Woessner, P.A.

(57) ABSTRACT

A machine may generate and store a correlation among multiple identifiers of the user that enable access to an application through multiple systems. For example, the user may have a first identifier for using a first social network system, and a second identifier for using a second social network system, and the machine may generate and store a correlation between the first identifier and the second identifier. The machine may identify the user based on the first identifier and access a database that stores the correlation. The machine may then access a configuration of the application based on the correlation and configure the application in accordance with the configuration. The machine may generate a visual representation of the configured application, provide the visual representation to a device of a further user, receive an indication of an opinion of the further user on the visual representation, and present the indication.

29 Claims, 9 Drawing Sheets

(56) References Cited

U.S. PATENT DOCUMENTS

2011/0238755 A1* 9/2011 Khan et al. .................... 709/204
2013/0005487 A1* 1/2013 Frazzini et al. ................. 463/43

OTHER PUBLICATIONS

"Zynga Brings Casual Hit Mafia Wars 2 Cross-Platform", GameLive.TV(http://www.gamerlive.tv/article/zynga-brings-casual-hit-mafia-wars-2-cross-platform), accessed Oct. 23, 2011, 1.

"Zynga seeks own game space away from Facebook", Yahoo! News (http://news.yahoo.com/zynga-seeks-own-game-space-away-facebook-191313826.html), accessed Mar. 1, 2012, 2.

"Zynga Uses Facebook(!) to Launch a New Platform for its Games—and for Other Developers", TechCrunch.Com (http://techcrunch.com/2012/03/01/zynga-uses-facebook-to-launch-a-new-p . . . ) (https://www.youtube.com/watch?feature=player_embedded&v=ZgHER30S4VA), accessed Mar. 1, 2012, 2.

\* cited by examiner

SHARING AN APPLICATION CONFIGURATION AMONG SOCIAL NETWORKS

RELATED APPLICATIONS

This application claims the priority benefit of U.S. Provisional Patent Application No. 61/605,602, filed Mar. 1, 2012, and the priority benefit of U.S. Provisional Patent Application No. 61/605,917, filed Mar. 2, 2012, which applications are incorporated herein by reference in their entirety.

TECHNICAL FIELD

The subject matter disclosed herein generally relates to the processing of data. Specifically, the present disclosure addresses systems and methods to facilitate sharing an application configuration.

BACKGROUND

One or more social networking services may be provided by one or more social network systems. Examples of such social network systems include Facebook®, Twitter®, or LinkedIn®. One or more machines (e.g., server machines) may form all or part of a social network system, and a machine within a social network system may manage one or more databases that store user data (e.g., user profiles) corresponding to users of a social networking service provided by the social network system.

BRIEF DESCRIPTION OF THE DRAWINGS

Some embodiments are illustrated by way of example and not limitation in the figures of the accompanying drawings.

DETAILED DESCRIPTION

Figure 1:
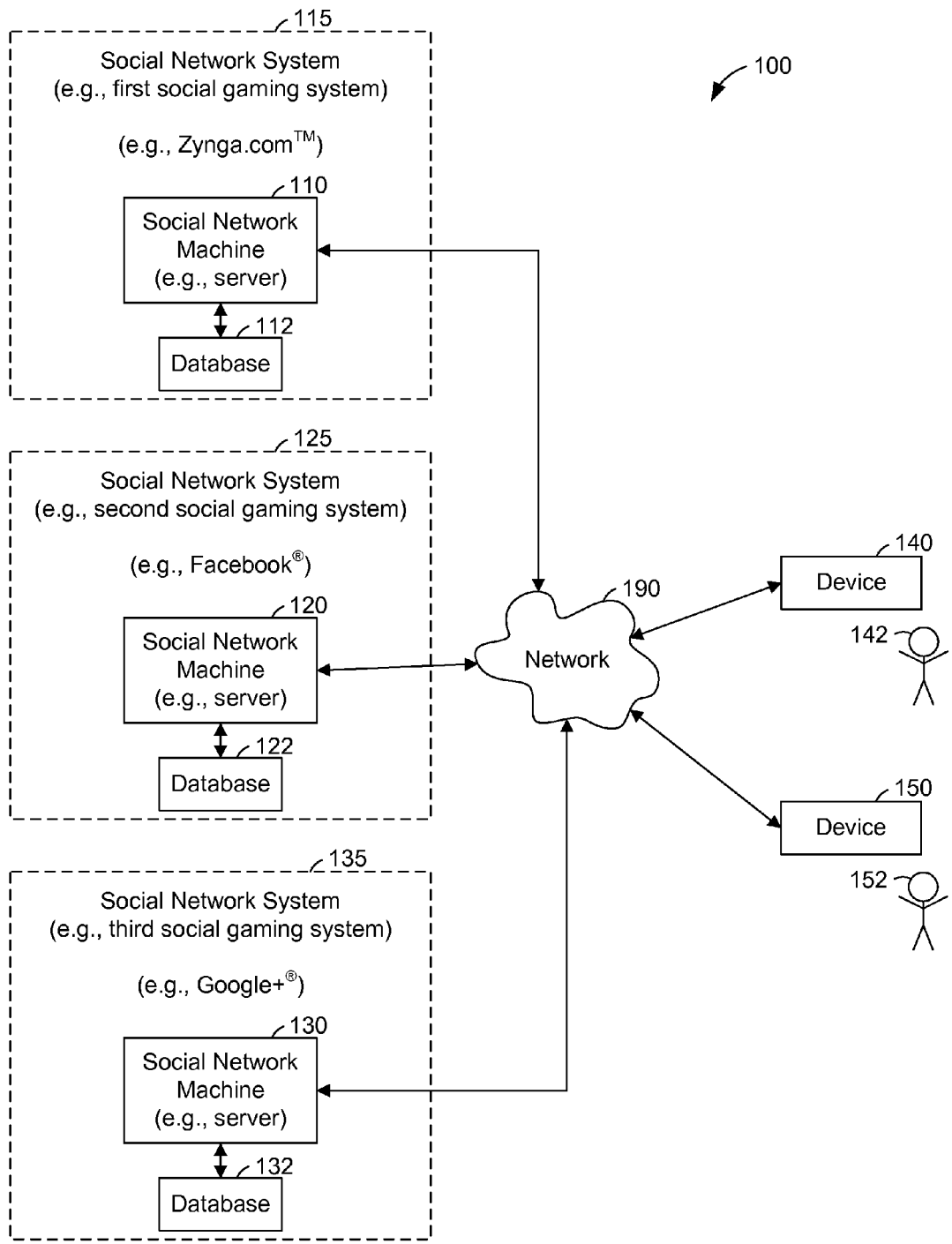
FIG. 1 is a network diagram illustrating a network environment suitable for sharing an application configuration among social networks, according to some example embodiments.

Example methods and systems are directed to sharing an application configuration among social networks. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

An application (e.g., a software application, such as a game, a word processor, a spreadsheet, or a calendar) may be accessible to a user through any of multiple systems. Such an application may be considered as a multi-system application or a multi-platform application. For example, a first system (e.g., a social network system, such as a social gaming system) may provide a user interface for accessing the application (e.g., as executed by one or more machines within the first system), and a second system (e.g., a different social network system) may provide a different user interface for accessing the same application (e.g., as executed by one or more machines within the second system). This may provide the user with a convenient way to access (e.g., execute) the application from the first system or from the second system, as desired. For example, the user may utilize multiple social network services (e.g., Facebook®, Twitter®, and Google+®) that each provide a user interface that enables access to the application (e.g., a game). Hence, the user may access the application (e.g., play the game) through any of the multiple social network services, according to the user's needs, desire, or convenience.

The application may be configurable, and the application may be executed (e.g., instantiated, launched, invoked, or run) in any of multiple states. For example, the application may be initially executed (e.g., initialized, initiated, or reset) in a default state (e.g., an initial, non-customized, starting, or beginning state), which may be considered as an initial configuration of the application. As another example, the application later may be executing in a non-default state (e.g., a current, customized, subsequent, or advanced state), which may be considered as a non-initial configuration.

Where the application is a game, the initial configuration may specify a beginner level of difficulty (e.g., "level 1"), a low or minimal level of experience in the game (e.g., zero experience), a small or nonexistent inventory of virtual items within the game (e.g., no items or only default items), a small or nonexistent degree of progress within the game (e.g., no achievements attained or no prizes won), an initial or default setting or preference of the game (e.g., for a user interface or game controller), or any suitable combination thereof. In contrast, the non-initial configuration may specify an advanced level of difficulty (e.g., "level 10"), a moderate or high level of experience in the game (e.g., 25,000 experience points), a large inventory of virtual items within the game (e.g., trophies, medals, treasure, money, or points), a large degree of progress within the game (e.g., many achievements attained or prizes won), a modified or customized setting or preference of the game (e.g., adjustments to a user interface or game controller), or any suitable combination thereof. In other words, the state of the game (e.g., representing a gameboard) may be defined by a game configuration that may vary as the game is played by the user (e.g., from an initial game state to a current game state).

A system that supports the application may provide the user with access to the application through an identifier of the user (e.g., a username or "user ID"). For example, the system may authenticate the user by authenticating the identifier of the user (e.g., verifying that the identifier enables access to the application). Based on (e.g., in response to) the authentication of the identifier, the system may provide a user interface within which the user may access the application. Where the application is a game, the system may provide the user interface in the form of a game environment (e.g., a virtual world that is communicated to a device of the user), where the game may be played by the user within the game environment. All or part of such a user interface may be provided as (e.g., in the form of) a web page, a browser widget, a client application, a mobile app, a remote graphical display, a data feed, or any suitable combination thereof.

A machine (e.g., a server machine within a social network system) may generate and store (e.g., within a database of the social network system) one or more correlations between various identifiers of the user that enable access to the application through various systems (e.g., other social network systems). For example, the user may have a first identifier for using a first social network system, and a second identifier for using a second social network system, and the machine may generate and store a correlation between the first identifier and the second identifier. The machine may identify the user based on the first identifier (e.g., authenticate the user by receiving the first identifier and a corresponding password from a device of the user) and access a database that stores the correlation (e.g., a database within a different social network system). The machine may then access (e.g., request to retrieve from the different social network system) a configuration of the application based on the correlation and configure the application in accordance with the configuration. Accordingly, the machine may use the correlation between the first and second identifiers to access and apply a configuration stored at a social network system different from its own.

Although the following discussion, for purposes of clarity, focuses on sharing a game configuration among social networks (e.g., among social network systems), a game configuration is simply an example of an application configuration. Likewise, a social network system is simply an example of a system (e.g., a network-based system). Hence, the systems and methodologies discussed herein are applicable generally to sharing an application configuration among various systems that support (e.g., provide a user with access to) the application.

FIG. 1 is a network diagram illustrating a network environment 100 suitable for sharing a configuration of an application among social network systems 115, 125, and 135, according to some example embodiments. The network environment 100 includes social network machines 110, 120, and 130, as well as devices 140 and 150, all communicatively coupled to each other via a network 190. A database 112 is communicatively coupled to the social network machine 110 (e.g., a server machine). A database 122 is communicatively coupled to the social network machine 120, and a database 132 is communicatively coupled to the social network machine 130. In some example embodiments, one or more of the databases 112, 122, and 132 are communicatively coupled directly to the network 190 (e.g., directly accessible by one or more of the devices 140 and 150). The social network machines 110, 120, and 130, the databases 112, 122, and 132, and the devices 140 and 150, each may be implemented in a computer system, in whole or in part, as described below with respect to FIG. 8.

As shown in FIG. 1, the social network machine 110, the database 112, or both, may form all or part of the social network system 115, which may support (e.g., provide access to) one or more applications (e.g., a game). The social network system 115 may be a social gaming system (e.g., a first social gaming system) that provides access to one or more games. Similarly, the social network machine 120, the database 122, or both, may form all or part of the social network system 125, which may support (e.g., provide access to) one or more applications. The social network system 125 may be a social gaming system (e.g., a second social gaming system) that provides access to one or more games (e.g., a game that is also supported by the social network system 115). Likewise, the social network machine 130, the database 132, or both, may form all or part of the social network system 135, which may support (e.g., provide access to) one or more applications. The social network system 135 may be a social gaming system (e.g., a third social gaming system) that provides access to one or more games (e.g., a game that is also supported by the social network system 115 and the social network system 125).

Also shown in FIG. 1 are users 142 and 152. One or both of the users 142 and 152 may be a human user (e.g., a human being), a machine user (e.g., a computer configured by a software program to interact with the device 140), or any suitable combination thereof (e.g., a human assisted by a machine or a machine supervised by a human). The user 142 is not part of the network environment 100, but is associated with the device 140 and may be a user of the device 140. For example, the device 140 may be a desktop computer, a vehicle computer, a tablet computer, a navigational device, a portable media device, or a smart phone belonging to the user 142. Likewise, the user 152 is not part of the network environment 100, but is associated with the device 150. As an example, the device 150 may be a desktop computer, a vehicle computer, a tablet computer, a navigational device, a portable media device, or a smart phone belonging to the user 152.

Any of the machines, databases, or devices shown in FIG. 1 may be implemented in a general-purpose computer modified (e.g., configured or programmed) by software to be a special-purpose computer to perform the functions described herein for that machine. For example, a computer system able to implement any one or more of the methodologies described herein is discussed below with respect to FIG. 8. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines illustrated in FIG. 1 may be combined into a single machine, and the functions described herein for any single machine may be subdivided among multiple machines.

The network 190 may be any network that enables communication between machines (e.g., social network machine 110 and the device 140). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof.

Figure 2:
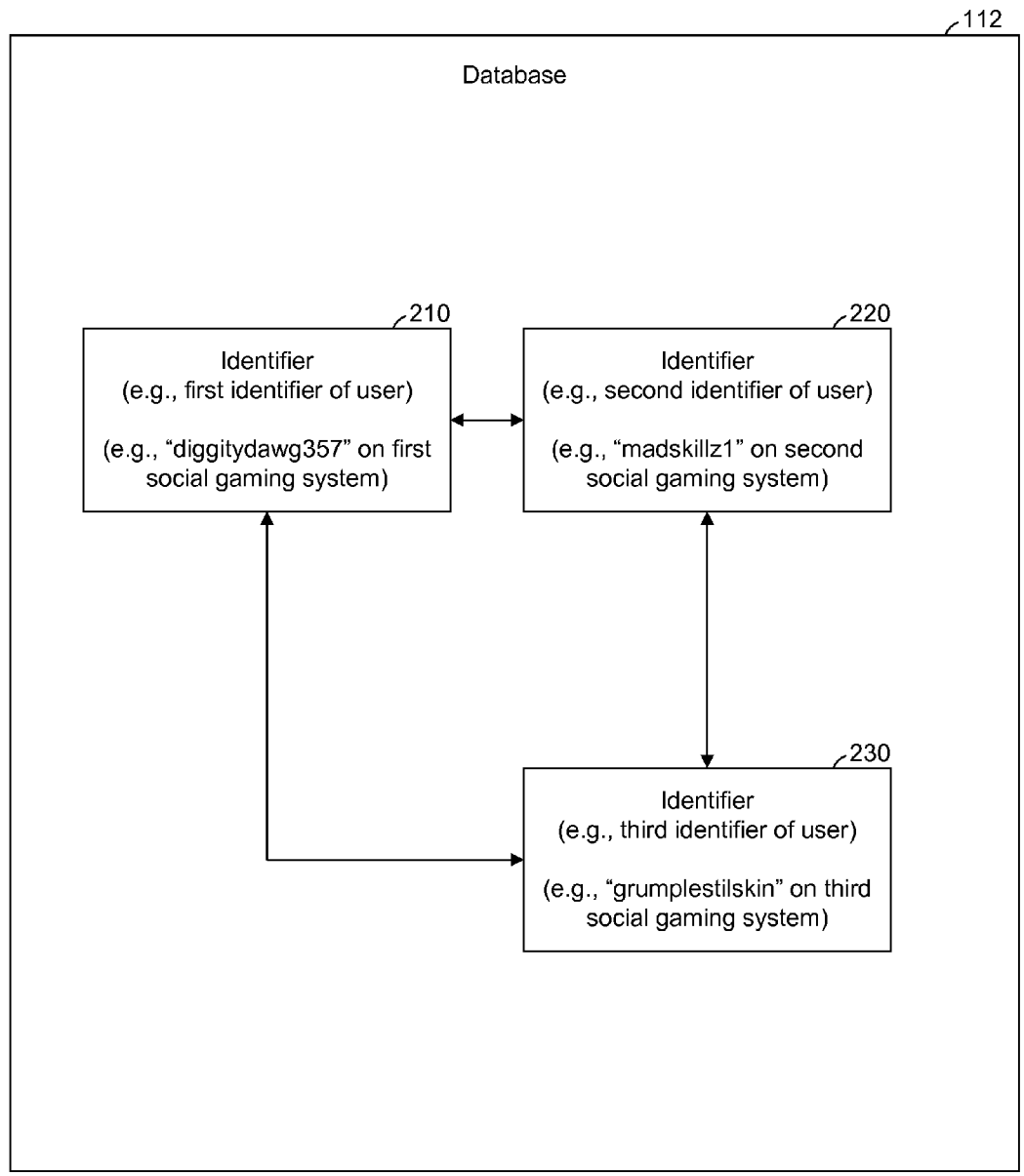
FIG. 2 is a block diagram illustrating a database that stores correlations between identifiers, according to some example embodiments.

FIG. 2 is a block diagram illustrating the database 112 storing correlations between identifiers of the user 142, according to some example embodiments. As shown, the database 112 stores identifiers 210, 220, and 230 of the user 142. The identifier 210 may be a first identifier of the user 142 (e.g., "diggitydawg357") and may identify the user 142 with respect to the social network system 115 (e.g., the first social gaming system). Similarly, the identifier 220 may be a second identifier of the user 142 (e.g., "madskillz1") and may identify the user 142 with respect to the social network system 125 (e.g., the second social gaming system). Likewise, the identifier 230 may be a third identifier of the user 142 (e.g., "grumpleskilskin") and may identify the user 142 with respect to the social network system 135 (e.g., the third social gaming system). FIG. 2 uses an arrow to depict a correlation between the identifier 210 and the identifier 220, another arrow to depict a correlation between the identifier 220 and the identifier 230, and further arrow to depict a correlation between the identifier 210 and the identifier 230. In practice, such correlations may be implemented in the database 112 via one or more tables, references (e.g., pointers or links), or any suitable combination thereof. Furthermore, one or more of the identifiers 210, 220, and 230 may be stored in the database 112 as corresponding to a configuration of an application. In some example embodiments, the functions of the database 112 are performed by the database 122, the database 132, or any suitable combination thereof.

Figure 3:
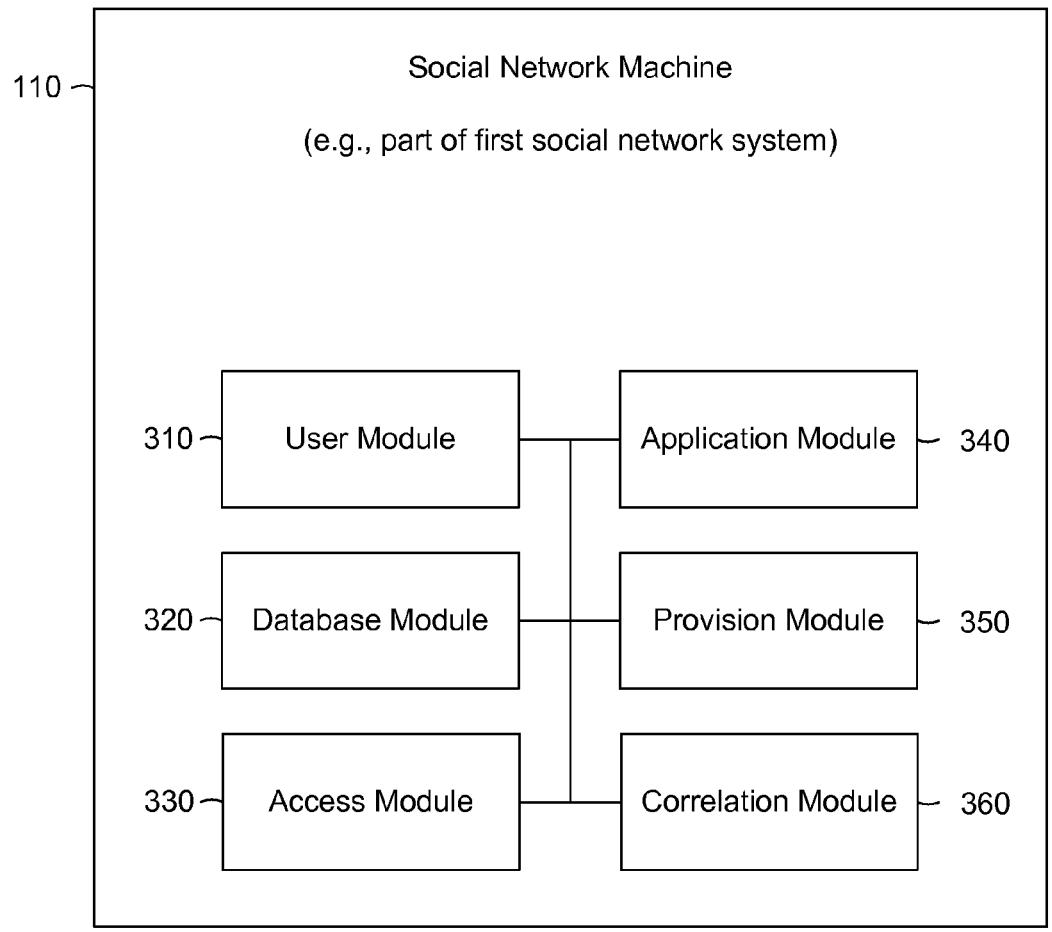
FIG. 3 is a block diagram illustrating components of a social network machine suitable for sharing an application configuration among social networks, according to some example embodiments.

FIG. 3 is a block diagram illustrating components of the social network machine 110, according to some example embodiments. The social network machine 110 includes a user module 310, a database module 320, an access module 330, an application module 340, a provision module 350, and the correlation module 360, all configured to communicate with each other (e.g., via a bus, shared memory, or a switch). Functions and operations performed by these modules (e.g., performed by the social network machine 110 as configured by these modules) are described below with respect to FIG. 6-7. Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. In certain example embodiments, any one or more of the modules described herein may also be implemented in the social network machine 120, the social network machine 130, or both.

Figure 4:
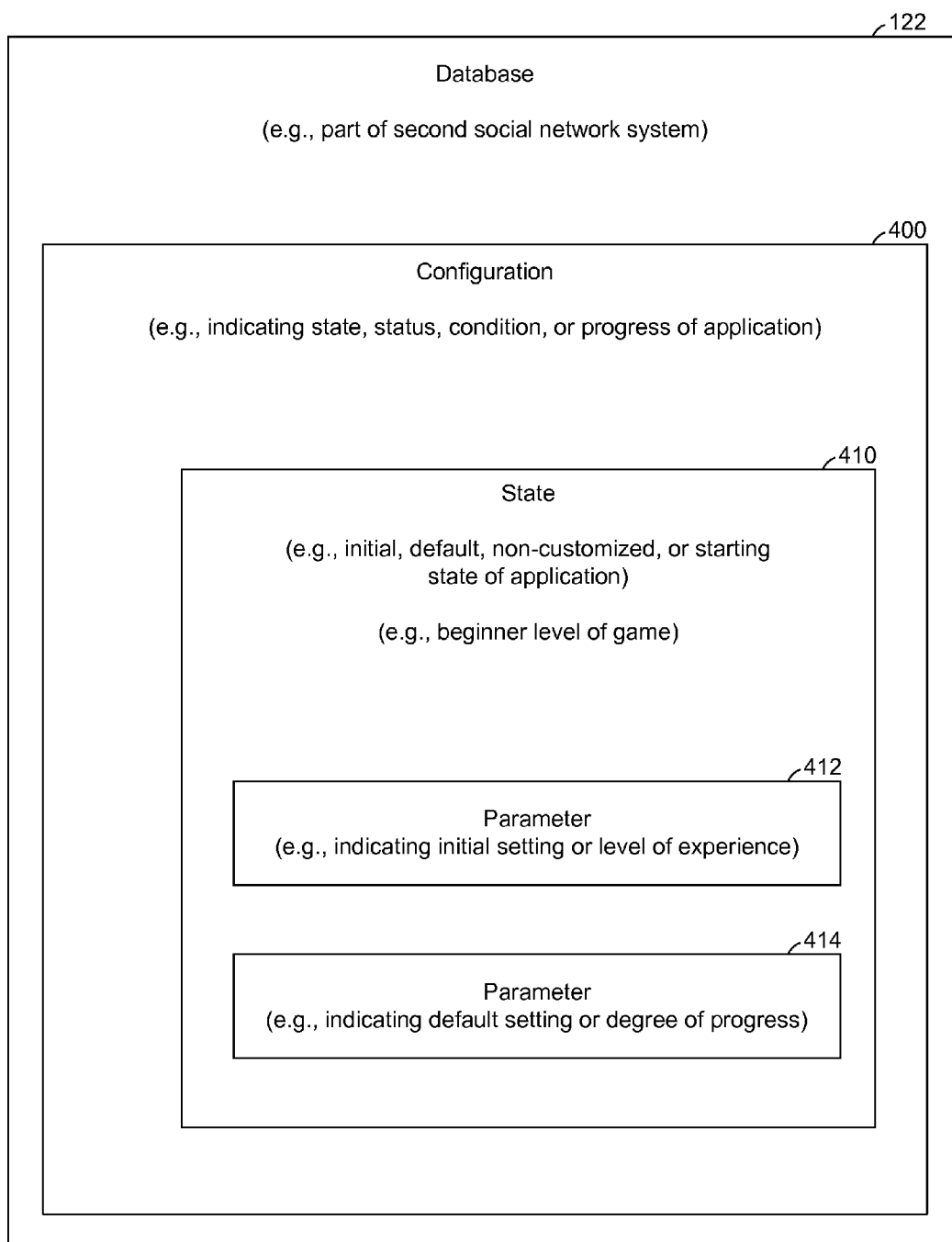
FIG. 4-5 are block diagrams illustrating a database that stores a configuration of an application, according some example embodiments.
Figure 5:
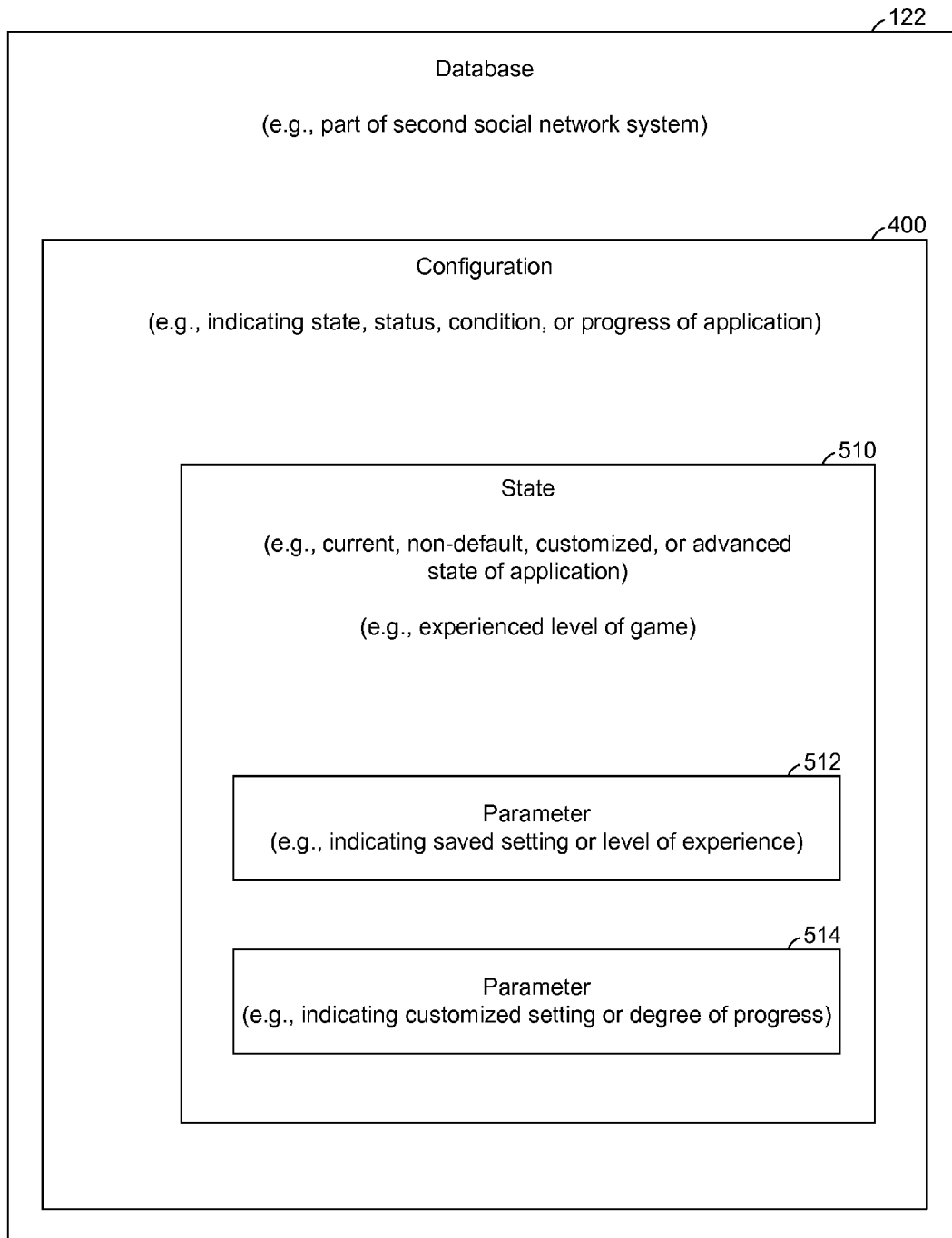

FIG. 4-5 are block diagrams illustrating the database 122 storing a configuration 400 of an application (e.g., a game, such as chess, checkers, or Farmville® by Zynga®), according some example embodiments. In some example embodiments, the functions of the database 122 are performed by the database 112, the database 132, or any suitable combination thereof.

As shown in FIG. 4-5, the database 122 includes (e.g., stores) the configuration 400. The configuration 400 may be stored in the database 122 as corresponding to one or more identifiers of a user (e.g., identifier 220 of the user 142). The configuration 400 may indicate a state (e.g., a status, condition, or degree of progress) of the application (e.g., the game).

As shown in FIG. 4, the configuration 400 indicates (e.g., by inclusion or by reference) a state 410 of the application. The state 410 may include parameters 412 and 414. Each of the parameters 412 and 414 may be assigned one or more values (e.g., a single value, a set of multiple values, or a range of values) that define at least a portion of the state 410 of the application. Accordingly, the configuration 400 may indicate that one or more values be assigned to one or more of the parameters 412 and 414. As examples, the state 410 may indicate an initial state of the application, a default state of the application, a non-customized state of the application, a starting state of the application, or any suitable combination thereof. Where the application is a game, the state 410 may indicate a beginner level (e.g., "level 1") of the game. Hence, one or both of the parameters 412 and 414 may indicate or specify an initial setting or preference of the game, a default setting or preference of the game, an initial level of experience (e.g., zero experience points) in the game, a default degree of progress (e.g., no achievements attained or prizes won) in the game, or any suitable combination thereof.

As shown in FIG. 5, the configuration 400 indicates a state 510 of the application. The state 510 may include parameters 512 and 514. Each of the parameters 512 and 514 may be assigned one or more values that define at least a portion of the state 510 of the application. Accordingly, the configuration 400 may indicate that one or more values be assigned to one or more of the parameters 512 and 514. As examples, the state 510 may indicate a current state of the application, a non-default state of the application, a customized state of the application, an advanced state of the application, or any suitable combination thereof. Where the application is a game, the state 510 may indicate an experience level (e.g., "level 100") of the game. Hence, one or both of the parameters 512 at 514 may indicate or specify a saved setting or preference of the game, a customized setting or preference of the game, a saved level of experience (e.g., 50,000 experience points) in the game, a customized (e.g., individualized) degree of progress in the game (e.g., 100 bronze achievements, 65 silver achievements, 22 gold achievements, 253 enemies defeated, and 63 virtual coins won), or any suitable combination thereof.

Figure 6:
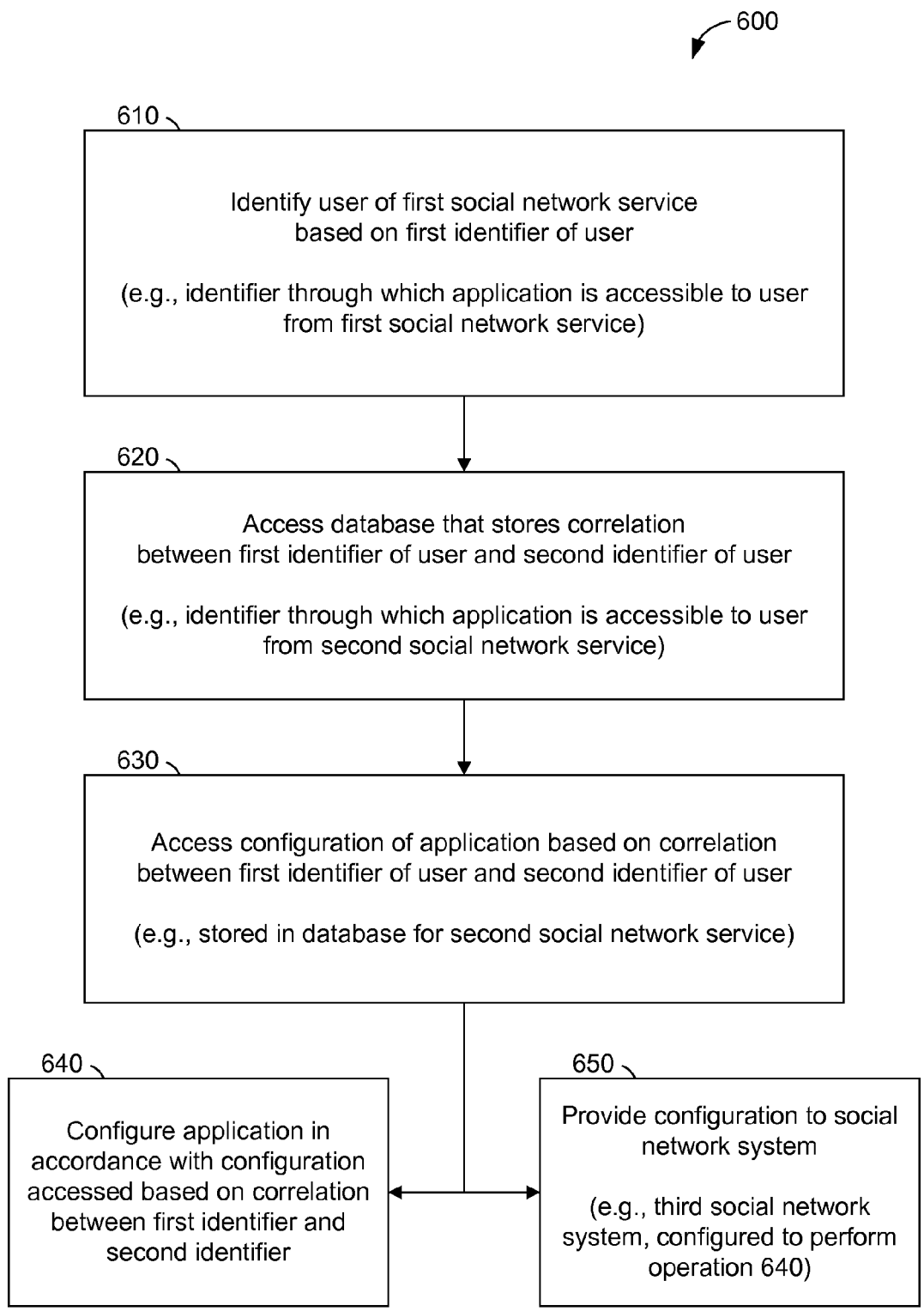
FIG. 6-7 are flowcharts illustrating operations of a social network machine in performing a method of sharing an application configuration among social networks, according to some example embodiments.
Figure 7:
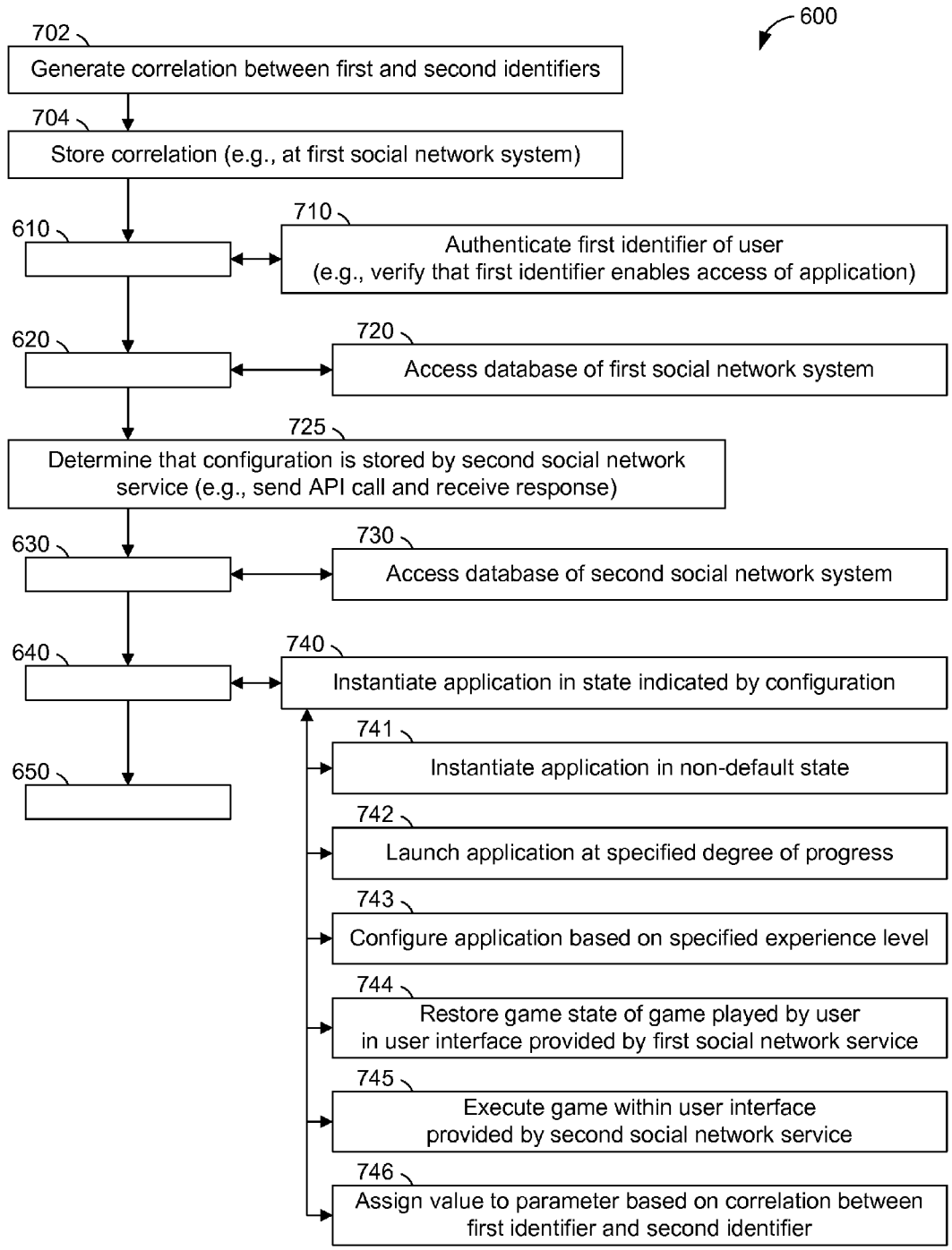

FIG. 6-7 are flowcharts illustrating operations of the social network machine 110 in performing a method 600 of sharing the configuration 400, according to some example embodiments. Operations in the method 600 may be performed by the social network machine 110, using modules described above with respect to FIG. 3. Similar operations may be performed by the device 140, which may be configured by modules similar to those described above with respect to FIG. 3. As shown in FIG. 6, the method 600 includes operations 610, 620, and 630. According to various example embodiments, the method 600 may include operation 640, operation 650, or both.

In operation 610, the user module 310 identifies the user 142. The user 142 may be a user of the social network system 115 (e.g., a first social network system, providing a first social network service). The user 142 may be identified based on the identifier 210 (e.g., a first identifier of the user 142) discussed above with respect to FIG. 2. As noted above, the identifier 210 may be an identifier through which an application (e.g., a game) is accessible to the user 142 from a social network service provided by the social network system 115. For example, the user module 310 may identify the user 142 by comparing the identifier 210 to an identifier received from the device 140 of the user 142 (e.g., received along with a corresponding password).

In operation 620, the database module 320 accesses a database (e.g., database 112) that stores a correlation between the identifier 210 (e.g., the first identifier of the user 142) and the identifier 220 (e.g., a second identifier of the user 142) discussed above with respect to FIG. 2. The user 142 may be a user of the social network system 125 (e.g., a second social network system, providing a second social network service). As noted above, the identifier 220 may be an identifier through which the application (e.g., accessible to the user 142 from the first social network service) is accessible to the user 142 from a social network service provided by the social network system 125. For example, the database module 320 may retrieve data records that include or reference the identifier 210 and the identifier 220 and determine that there is a correlation between the identifier 210 and the identifier 220.

In operation 630, the access module 330 accesses the configuration 400 of the application (e.g., from the database 122 in the social network system 125). The accessing of the configuration 400 may be based on the correlation between the identifier 210 and the identifier 220, discussed above with respect to operation 620. For example, the database 122 may store the configuration 400 and corresponding to the identifier 220 of the user 142. Accordingly, based on the correlation between the identifier 210 (e.g., from operation 610) and the identifier 220 (e.g., from operation 620), the access module 330 may request, read, or retrieve the configuration 400 of the application (e.g., of the game).

In operation 640, the application module 340 configures the application (e.g., the game) based on (e.g., in accordance with) the configuration 400 (e.g., accessed in operation 630). The configuring of the application may be based on the correlation (e.g., from operation 620) between the identifier 210 (e.g., from operation 610) and the identifier 220 (e.g., from operation 620). The configuring of the application based on the configuration 400 may include restoring a state (e.g., state 410 or state 510) of the application, as indicated or specified by the configuration 400. Further details of operation 640 are discussed below with respect to FIG. 7.

In operation 650, the provision module 350 provides the configuration 400 to a system (e.g., outside the social network system 115) that supports the application (e.g., the game). For example, the provision module 350 may provide the configuration 400 to the social network system 135 (e.g., to the social network machine 130, the database 132, or both). The system (e.g., social network system 135) to which the configuration 400 is provided may be configured to provide a social network service (e.g., a third social network service) that configures the application (e.g., the game) based on (e.g., in accordance with) the provided configuration 400. According to various example embodiments, this system (e.g., social network system 135) is configured to perform operation 640 (e.g., by executing the application module 340 on the social network machine 130), as described above. The providing of the configuration 400 may include providing a state (e.g., state 410 or state 510) of the application, as indicated or specified by the configuration 400.

As shown in FIG. 7, various example embodiments of the method 600 may include any one or more of operations 702, 704, 710, 720, 725, 730, 740, 741, 742, 743, 744, 745, and 746. As shown, one or more of operations 702 and 704 may be performed prior to operation 610, in which the user module 310 identifies the user 142. In operation 702, the correlation module 360 generates the correlation between the identifier 210 and the identifier 220 (e.g., the correlation between the first identifier of the user 142 and the second identifier of the user 142). For example, the correlation module 360 may generate a map that correlates the identifier 210 to the identifier 220 (e.g., by reference, pointer, or link). In operation 704, the correlation module 360 stores a correlation in the database 112 (e.g., for access by the database module 320 in operation 620).

Operation 710 may be performed as part (e.g., a precursor task, a subroutine, or a portion) of operation 610, in which the user module 310 may identify the user 142 based on the identifier 210 (e.g., the first identifier). In operation 710, the user module 310 authenticates the identifier 210. For example, the user module 310 may verify that the identifier 210 enables access of the application (e.g., the game) by the user 142. In some example embodiments, the user module 310 receives the identifier 210 (e.g., along with a corresponding password) and determines (e.g., based on the identifier 210 and the corresponding password) that the user 142 is allowed to access the application.

Operation 720 may be performed as part of operation 620, in which the database module 320 accesses the database that stores the correlation between the identifier 210 (e.g., the first identifier) and the identifier 220 (e.g., the second identifier). In operation 720, the database module 320 accesses the database 112. As noted above, the database 112 may store the correlation between the identifier 210 and the identifier 220. Accordingly, the database module 320 may access the database 112 within the social network system 115 to access (e.g., request, read, or retrieve) the correlation between the identifier 210 and the identifier 220.

Operation 725 may be performed after operation 620. In operation 725, the database module 320 determines that the configuration 400 is stored by the social network system 125 (e.g., by the second social network system). For example, the database module 320 may determine that the configuration 400 is stored in the database 122. This determination may be made through one or more communications with the social network system 125 (e.g., social network machine 120, database 122, or both). As an example, the database module 320 may send an application programming interface (API) call to the social network machine 120 and receive a response which indicates that the configuration 400 is stored in the database 122.

Alternatively, in some example embodiments, the database module 320, in performing operation 725, may determine that the configuration 400 is stored by the social network system 115 (e.g., by the first social network system). For example, the database module 320 may query the database 112 and determine that the configuration 400 is stored therein.

Operation 730 may be performed as part of operation 630, in which the access module 330 accesses the configuration 400 of the application (e.g., the game) based on the correlation between the identifier 210 and the identifier 220. In operation 730, the access module 330 accesses the database 122. As noted above, the database 122 may store the configuration 400. Moreover, the accessing of the configuration 400 may be based on (e.g., in response to) the determination made in operation 725. Accordingly, the access module 330 may access the database 122 within the social network system 125 to access the configuration 400. Operation 730 may be performed based on the correlation between the identifier 210 and the identifier 220.

Alternatively, in some example embodiments, the access module 330, in performing operation 730, may access the configuration 400 by accessing the database 112. This accessing of the configuration 400 may be based on (e.g., in response to) a determination in operation 725 that the configuration 400 is stored by the social network system 115. Accordingly, the access module 330 may access the database 112 within the social network system 115 to access the configuration 400, based on the correlation between the identifier 210 and the identifier 220.

Operation 740 may be performed as part of operation 640, in which the application module 340 configures the application (e.g., the game) based on (e.g., in accordance with) the configuration 400 (e.g., as accessed in operation 630). In operation 740, the application module 340 instantiates the application (e.g., the game) in a state (e.g., state 410 or state 510) indicated by the configuration 400. For example, the application module 340 may instantiate the application using one or more of the parameters 412 and 414 that define the state 410 (e.g., a default state) of the application. As another example, the application module 340 may instantiate the application by applying one or more of the parameters 512 and 514 that define the state 510 (e.g., a non-default state) of the application.

One or more of operations 741-746 may be performed as part of operation 740. In operation 741, the application module 340 instantiates the application (e.g., the game) in the state 510 (e.g., the non-default state) of the application. This may be performed by applying one or more of the parameters 512 and 514 to the application (e.g., assigning one or more values of the parameter 512 or of the parameter 514 to the application).

In operation 742, the application module 340 launches the application (e.g., begins execution of the application) at a degree of progress specified by the configuration 400 (e.g., as indicated by the parameter 414 or the parameter 514). This may be performed by applying one or more of the parameters 414 and 514 to the application (e.g., assigning one or more values of the parameter 414 or of the parameter 514 to the application). According to various example embodiments, the degree of progress represents an extent to which a set of tasks within the application has been completed (e.g., goals or quests within a game).

In operation 743, the application module 340 configures the application (e.g., the game) based on an experience level specified by the configuration 400 (e.g., as indicated by the parameter 412 or the parameter 512). This may be performed by applying one or more of the parameters 412 and 512 to the application (e.g., assigning one or more values of the parameter 412 or of the parameter 512 to the application). According to various example embodiments, the experience level represents a quantity of events presented by the application to a user (e.g., a number of victories or defeats experienced by a player character within a game).

In operation 744, the application module 340, in configuring the application (e.g., the game), restores a game state (e.g., a gameboard) of a game (e.g., as an example of the application) played by the user 142. In some example embodiments, the configuration 400 is or includes a saved game state (e.g., a game save point within gameplay of the game). Such a game state may be stored by the social network system 125 (e.g., in database 122) prior to performance of the method 600 (e.g., in response to the user 142 pausing or stopping gameplay), and such a game state may be restored in operation 744 (e.g., in response to, or in preparation for, a request by the user 142 to resume or restart gameplay). According to various example embodiments, the game state represents the set of all parameters (e.g., parameters 412 and 414) that define a configuration (e.g., configuration 400) of a game.

In operation 745, the application module 340 executes the game discussed above with respect to operation 744. Moreover, the game may be executed through the social network system 115 (e.g., executed by the social network machine 110). Furthermore, the game may be executed using the game state restored in operation 744. This may have the effect of allowing the user 142 (e.g., as a player of the game) to play the game from his or her last saved point (e.g., degree of progress) within the game's gameplay (e.g., plot or event timeline), but through the social network system 115, instead of the social network system 125.

In operation 746, the application module 340 assigns a value of a parameter (e.g., a value of the parameter 512, as indicated in the state 510) in the configuring of the application (e.g., the game) in operation 640. This assignment of the value may be performed based on the correlation between the identifier 210 and the identifier 220 (e.g., accessed in operation 620).

According to various example embodiments, one or more of the methodologies described herein may facilitate sharing of an application configuration among social network systems. Moreover, one or more of the methodologies described herein may facilitate an enjoyable and convenient experience by a player of a game that is playable through any of multiple social network systems. Hence, one or more the methodologies described herein may facilitate pausing or stopping an application on one system and then resuming or restarting the application on another system, in the same state as when the application was paused or stopped.

When these effects are considered in aggregate, one or more of the methodologies described herein may obviate a need for certain efforts or resources that otherwise would be involved in using an application (e.g., playing a game) on multiple systems (e.g., platforms) that support the application (e.g., the game). Efforts expended by a user in reconstructing or restoring a configuration (e.g., state) of an application may be reduced by one or more of the methodologies described herein. Computing resources used by one or more machines, databases, or devices (e.g., within the network environment 100) may similarly be reduced. Examples of such computing resources include processor cycles, network traffic, memory usage, data storage capacity, power consumption, and cooling capacity.

Figure 8:
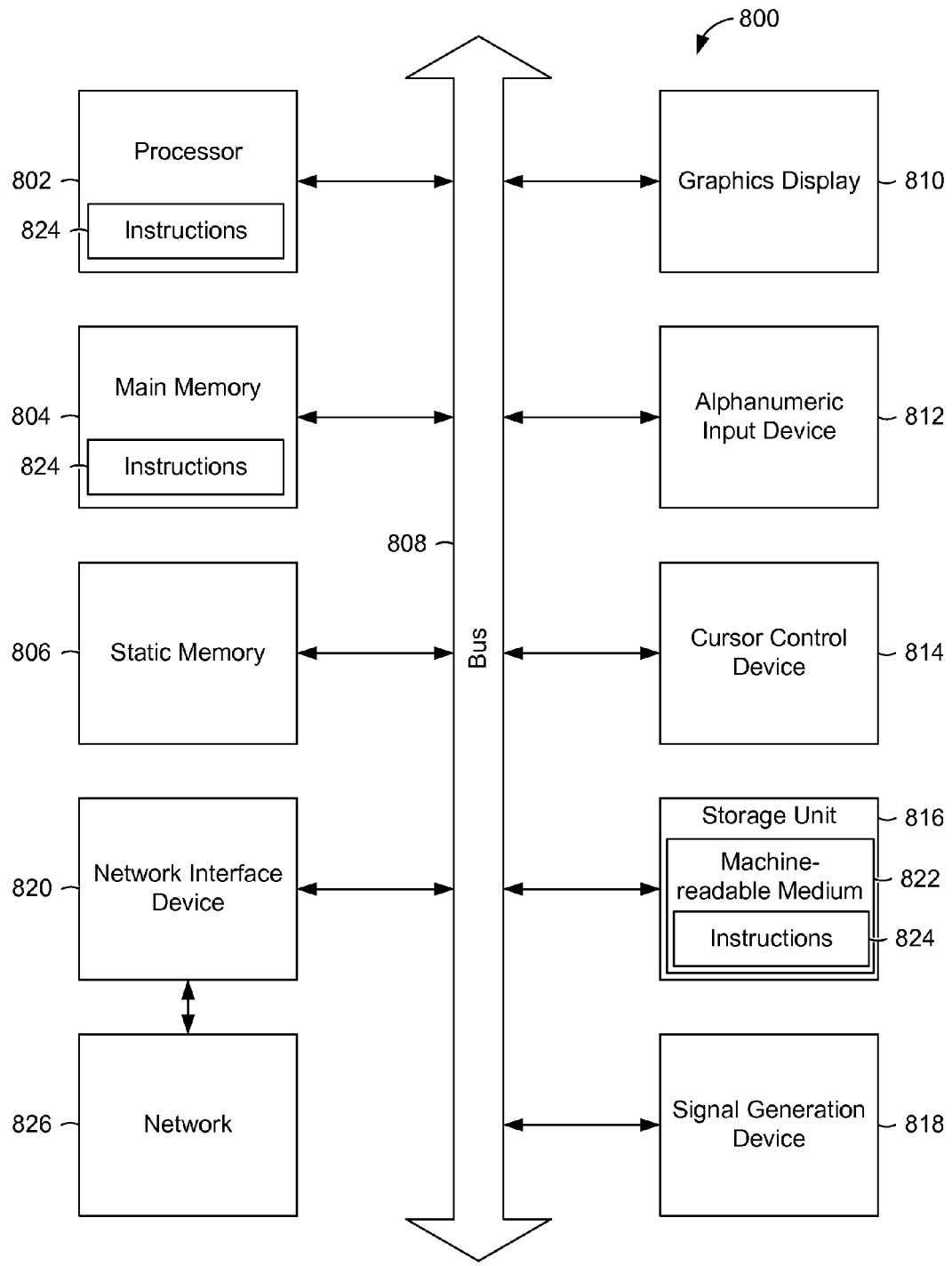
FIG. 8 is a block diagram illustrating components of a machine, according to some example embodiments, able to read instructions from a machine-readable medium and perform any one or more of the methodologies discussed herein.

FIG. 8 is a block diagram illustrating components of a machine 800, according to some example embodiments, able to read instructions from a machine-readable medium (e.g., a machine-readable storage medium) and perform any one or more of the methodologies discussed herein. Specifically, FIG. 8 shows a diagrammatic representation of the machine 800 in the example form of a computer system and within which instructions 824 (e.g., software) for causing the machine 800 to perform any one or more of the methodologies discussed herein may be executed. In alternative embodiments, the machine 800 operates as a standalone device or may be connected (e.g., networked) to other machines. In a networked deployment, the machine 800 may operate in the capacity of a server machine or a client machine in a server-client network environment, or as a peer machine in a peer-to-peer (or distributed) network environment. The machine 800 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 824, sequentially or otherwise, that specify actions to be taken by that machine. Further, while only a single machine is illustrated, the term "machine" shall also be taken to include a collection of machines that individually or jointly execute the instructions 824 to perform any one or more of the methodologies discussed herein.

The machine 800 includes a processor 802 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 804, and a static memory 806, which are configured to communicate with each other via a bus 808. The machine 800 may further include a graphics display 810 (e.g., a plasma display panel (PDP), a light emitting diode (LED) display, a liquid crystal display (LCD), a projector, or a cathode ray tube (CRT)). The machine 800 may also include an alphanumeric input device 812 (e.g., a keyboard), a cursor control device 814 (e.g., a mouse, a touchpad, a trackball, a joystick, a motion sensor, or other pointing instrument), a storage unit 816, a signal generation device 818 (e.g., a speaker), and a network interface device 820.

The storage unit 816 includes a machine-readable medium 822 on which is stored the instructions 824 (e.g., software) embodying any one or more of the methodologies or functions described herein. The instructions 824 may also reside, completely or at least partially, within the main memory 804, within the processor 802 (e.g., within the processor's cache memory), or both, during execution thereof by the machine 800. Accordingly, the main memory 804 and the processor 802 may be considered as machine-readable media. The instructions 824 may be transmitted or received over a network 826 (e.g., network 190) via the network interface device 820.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 822 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., software) for execution by a machine (e.g., machine 800), such that the instructions, when executed by one or more processors of the machine (e.g., processor 802), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Figure 9:
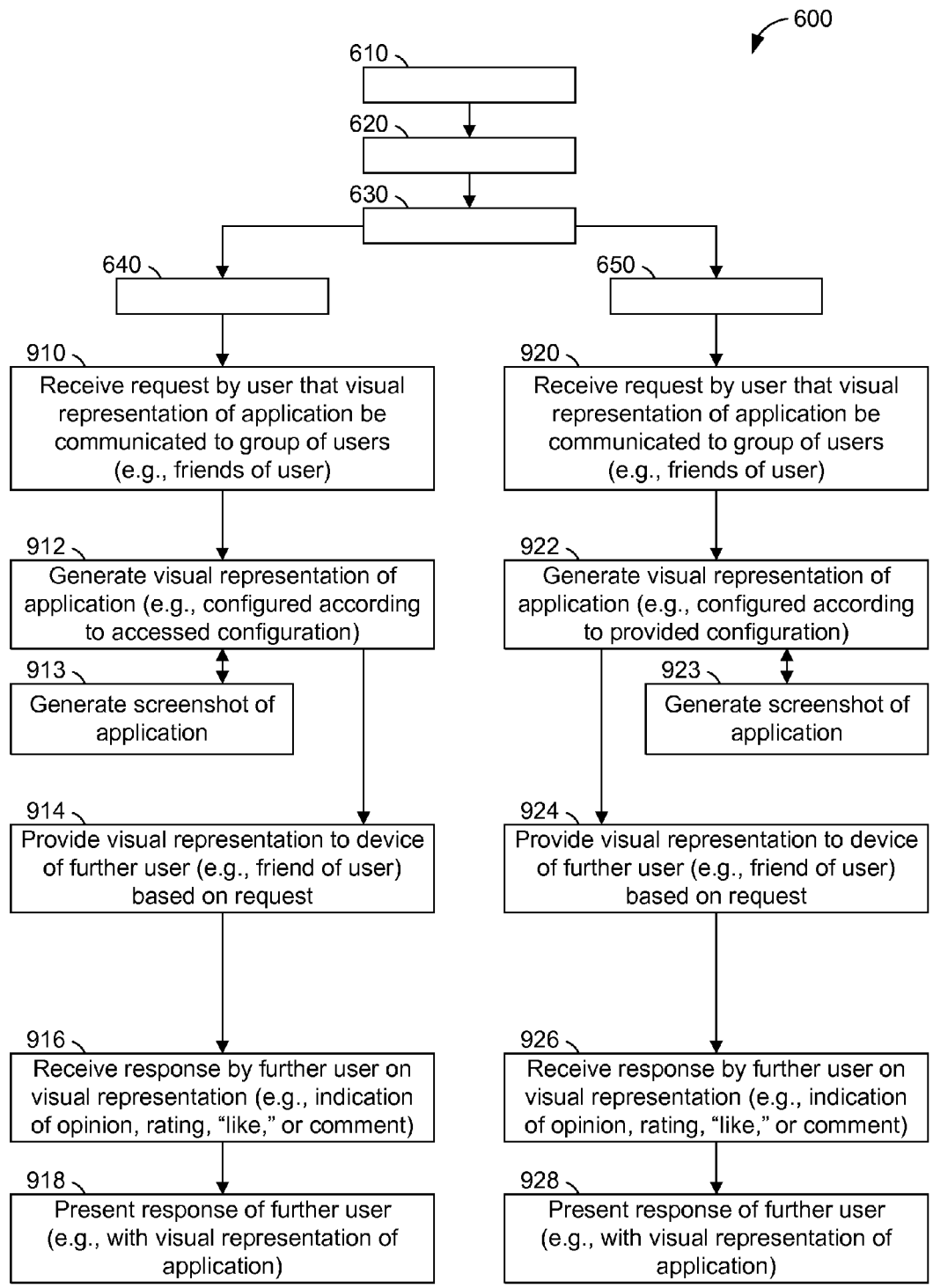
FIG. 9 is a flowchart illustrating further operations of the social network machine in performing the method of sharing an application configuration among social networks, according to some example embodiments.

FIG. 9 is a flowchart illustrating further operations of the social network machine 110 in performing the method 600, according to some example embodiments. As shown, the method may include one or more of operations 910, 912, 913, 914, 916, 918, 920, 922, 923, 924, 926, and 928.

One or more of operations 910-918 may be performed after operation 640, in which the application module 340 configures the application (e.g., the game) based on (e.g., in accordance with) the configuration 400 (e.g., as accessed in operation 630). In operation 910, the user module 310 receives a request (e.g., a share request) that a visual representation of the application be generated and communicated to a group of users (e.g., friends, followers, or connections of the user 142). For example, the user module 310 may receive the request from the device 140 of the user 142. Since the application is configured (e.g., in operation 640) according to the configuration 400, this visual representation of the application may visually represent the application in a state (e.g., state 410 or state 510) indicated by the configuration 400. As an example, the visual representation may be a screenshot of the application (e.g., a screen capture of the game). In some example embodiments, the request indicates that the user 142 would like to socially share the visual representation among a group of users that includes one or more members of his social network (e.g., other users socially connected to the user 142 by one or more social network services provided by the social network system 115, the social network system 125, the social network system 135, or any suitable combination thereof).

In operation 912, the user module 310 generates the visual representation of the application (e.g., the visual representation of the game). As noted above, the visual representation may be generated based on (e.g., from) the application as configured by the configuration 400 (e.g., in operation 640). Thus, the generated visual representation of the application may visually represent the state (e.g., state 410 or state 510) of the application. As examples, the visual representation may be a screenshot (e.g., an image of a game environment within the game, showing game pieces or virtual items), a progress chart (e.g., a timeline, line graph, or pie chart indicating progress towards a goal), a list of achievements (e.g., a list of tasks performed, awards received, prizes or points won, or enemies defeated), or any suitable combination thereof.

Operation 913 may be performed as part of operation 912. In operation 913, the user module 310 generates the visual representation of the application by generating a screenshot of the application. For example, the user module 310 may access a memory (e.g., a frame buffer in the device 140 or in the social network machine 110) that stores all or part of a user interface in which access to the application is provided. The user module 310 may generate the screenshot by storing an image of all or part of the user interface that provides access to the application (e.g., the game).

In operation 914, the user module 310 provides the visual representation to the device 150 of the user 152 (e.g., a further user, who may be a friend of the user 142). The visual representation (e.g., screenshot) may be provided based on (e.g., in response to) the request received in operation 910. Furthermore, the visual representation may be provided to the device 150 based on the user 152 being socially connected to the user 142 (e.g., being a member of one or more social networks of the user 142, according to one or more social network services provided by the social network system 115, the social network system 125, the social network system 135, or any suitable combination thereof).

In operation 916, the user module 310 receives a response by the user 152. The response may include an indication of an opinion of the user 152, and the response may be received from the device 150 of the user 152. Examples of the indication include a rating (e.g., 3 of 5 stars, or "good"), a vote (e.g., a "like" or some other positive mark or tag), a comment (e.g., "Good job!" or "How did you do this in only 2 days?"), and any suitable combination thereof. Accordingly, responses to the visual representation may be received from one or more users (e.g., user 152) with whom the visual representation is shared.

In operation 918, the user module 310 presents some or all of the response received in operation 916. The indication may be presented in a user interface in which access to the application (e.g., the game) is provided. For example, the indication may be presented (e.g., along with the visual representation of the application) within a user interface provided by the social network system 115 (e.g., for providing access to the application). Accordingly, the visual representation may be socially shared among a social network of the user 142, and members of the social network (e.g., user 152) may submit indications of their opinions on the visual representation for display with the visual representation (e.g., to other members of the social network, or to the general public).

One or more of operations 920-928 may be performed after operation 650, in which the provision module 350 provides the configuration 400 (e.g., to the social network system 135). As noted above, the configuration 400 may be provided to enable the social network system 135 (e.g., via a social network machine 130) to configure the application based on the configuration 400.

In operation 920, the user module 310 receives a request (e.g., a share request) that a visual representation of the application be generated and communicated to a group of users (e.g., friends, followers, or connections of the user 142). For example, the user module 310 may receive the request from the device 140 of the user 142. Since the application is configured (e.g., by the social network machine 130, performing an operation similar to operation 640) according to the configuration 400, this visual representation of the application may visually represent the application in a state (e.g., state 410 or state 510) indicated by the configuration 400. As noted above, the visual representation may be a screenshot of the application (e.g., a screen capture of the game). In some example embodiments, the request indicates that the user 142 would like to socially share the visual representation among a group of users that includes one or more members of his social network (e.g., other users socially connected to the user 142 by one or more social network services provided by the social network system 115, the social network system 125, the social network system 135, or any suitable combination thereof).

In operation 922, the user module 310 generates the visual representation of the application (e.g., the visual representation of the game). As noted above, the visual representation may be generated based on (e.g., from) the application as configured by the configuration 400 (e.g., by the social network machine 130) provided in operation 650. Thus, the generated visual representation of the application may visually represent the state (e.g., state 410 or state 510) of the application. As examples, the visual representation may be a screenshot (e.g., an image of a game environment within the game, showing game pieces or virtual items), a progress chart (e.g., a timeline, line graph, or pie chart indicating progress towards a goal), a list of achievements (e.g., a list of tasks performed, awards received, prizes or points won, or enemies defeated), or any suitable combination thereof.

Operation 923 may be performed as part of operation 922. In operation 923, the user module 310 generates the visual representation of the application by generating a screenshot of the application. For example, the user module 310 may access a memory (e.g., a frame buffer in the device 140 or in the social network machine 110) that stores all or part of a user interface in which access to the application is provided. The user module 310 may generate the screenshot by storing an image of all or part of the user interface that provides access to the application (e.g., the game).

In operation 924, the user module 310 provides the visual representation to the device 150 of the user 152 (e.g., a further user, who may be a friend of the user 142). The visual representation (e.g., screenshot) may be provided based on (e.g., in response to) the request received in operation 920. Furthermore, the visual representation may be provided to the device 150 based on the user 152 being socially connected to the user 142 (e.g., being a member of one or more social networks of the user 142, according to one or more social network services provided by the social network system 115, the social network system 125, the social network system 135, or any suitable combination thereof).

In operation 926, the user module 310 receives a response by the user 152. The response may include an indication of an opinion of the user 152, and the response may be received from the device 150 of the user 152. Examples of the indication include a rating (e.g., 3 of 5 stars, or "good"), a vote (e.g., a "like" or some other positive mark or tag), a comment (e.g., "Good job!" or "How did you do this in only 2 days?"), and any suitable combination thereof. Accordingly, responses to the visual representation may be received from one or more users with whom the visual representation is shared.

In operation 928, the user module 310 presents some or all of the response received in operation 926. The indication may be presented in a user interface in which access to the application (e.g., the game) is provided. For example, the indication may be presented (e.g., along with the visual representation of the application) within a user interface provided by the social network system 115 (e.g., for providing access to the application). Accordingly, the visual representation may be socially shared among a social network of the user 142, and members of that social network (e.g., user 152) may submit indications of their opinions on the visual representation for display with the visual representation (e.g., for display to other members of the social network or to the general public).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities. Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:
   identifying a user of a first social network service based on a first identifier of the user through which an application is accessible to the user from the first social network service;
   accessing a database that stores a correlation between the first identifier of the user and a second identifier of the user through which the application accessible to the user from the first social network service is accessible to the user from a second social network service;
   accessing a non-initial configuration of the application, the non-initial configuration corresponding to the user and indicating a non-initial state of the application, the accessing of the non-initial configuration being based on the correlation between the first identifier of the user and the second identifier of the user; and
   configuring the application in accordance with the non-initial configuration accessed based on the correlation between the first identifier and the second identifier, the configuring of the application being performed by a processor of a machine.

2. The method of claim 1, wherein:
   the application is a game played by the user within a user interface provided by the first social network service;
   the configuration is a game state stored by the first social network service that provided the user interface within which the user played the game; and
   the configuring of the application includes restoring the game state of the game played by the user.

3. The method of claim 2, wherein:
   the configuring of the application includes executing the game through the first social network service from the restored game state.

4. The method of claim 1, wherein:
   the configuration indicates a state of the application; and
   the configuring of the application includes instantiating the application in the state indicated by the configuration.

5. The method of claim 4, wherein:
the state indicated by the configuration is a non-default state of the application distinct from a default state of the application; and
the configuring of the application includes instantiating the application in the non-default state of the application.

6. The method of claim 4, wherein:
the state indicated by the configuration specifies a degree of progress made by the user within the application; and
the configuring of the application includes launching the application at the specified degree of progress made by the user within the application.

7. The method of claim 4, wherein:
the state indicated by the configuration specifies an experience level that is greater than an initial level available within the application; and
the configuring of the application is based on the specified experience level.

8. The method of claim 1, wherein:
the identifying of the user includes authenticating the first identifier through which the application is accessible to the user from the first social network service.

9. The method of claim 1, wherein:
the database stores a further correlation between the second identifier of the user and the configuration of the application; and
the accessing of the configuration of the application is based on the further correlation between the second identifier and the configuration.

10. The method of claim 1, wherein:
the application is configurable by assigning a value to a parameter of the application;
the configuration indicates that the value be assigned to the parameter of the application; and
the configuring of the application includes assigning the value to the parameter of the application based on the correlation between the first identifier of the user and the second identifier of the user.

11. The method of claim 1, wherein:
the accessing the database includes accessing a first social network system that provides the first social network service; and
the accessing of the configuration of the application includes accessing a second social network system that provides the second social network service.

12. The method of claim 1 further comprising:
generating the correlation between the first identifier of the user through which the application is accessible to the user from the first social network service and the second identifier of the user through which the application is accessible from the second social network service; and
storing the correlation in the database.

13. The method of claim 1 further comprising:
determining that the configuration of the application is stored by the second social network service; and wherein
the accessing of the configuration of the application is performed based on the determining that the configuration is stored by the second social network service.

14. The method of claim 1 further comprising:
generating a visual representation of the application configured according to the configuration accessed based on the correlation between the first identifier of the user and the second identifier of the user; and
providing the visual representation to a device of a further user.

15. The method of claim 14, wherein:
the generating of the visual representation generates a screenshot of the application configured according to the configuration accessed based on the correlation between the first identifier of the user and the second identifier of the user.

16. The method of claim 14, wherein:
the providing of the visual representation to the device of the further user is in response to a request by the user that the visual representation be communicated to a group of users inclusive of the further user.

17. The method of claim 14 further comprising:
receiving an indication of an opinion of the further user on the visual representation of the application configured according to the configuration accessed based on the correlation; and
presenting the indication of the opinion with the visual representation of the application.

18. A non-transitory machine-readable storage medium comprising instructions that, when executed by one or more processors of a machine, cause the machine to perform operations comprising:
identifying a user of a first social network service based on a first identifier of the user through which an application is accessible to the user from the first social network service;
accessing a database that stores a correlation between the first identifier of the user and a second identifier of the user through which the application accessible to the user from the first social network service is accessible to the user from a second social network service;
accessing a non-initial configuration of the application, the non-initial configuration corresponding to the user and indicating a non-initial state of the application, the accessing of the non-initial configuration being based on the correlation between the first identifier of the user and the second identifier of the user; and
configuring the application in accordance with the non-initial configuration accessed based on the correlation between the first identifier and the second identifier, the configuring of the application be performed by the one or more processors of the machine.

19. The non-transitory machine-readable storage medium of claim 18, wherein:
the application is a game played by the user within a user interface provided by the first social network service;
the configuration is a game state stored by the first social network service that provided the user interface within which the user played the game; and
the configuring of the application includes restoring the game state of the game played by the user.

20. A system comprising:
a user module configured to identify a user of a first social network service based on a first identifier of the user through which an application is accessible to the user from the first social network service;
a database module configured to access a database that stores a correlation between the first identifier of the user and a second identifier of the user through which the application accessible to the user from the first social network service is accessible to the user from a second social network service;
an access module configured to access a non-initial configuration of the application, the non-initial configuration corresponding to the user and indicating a non-initial state of the application, the accessing of the non-initial configuration being based on the correlation between the first identifier of the user and the second identifier of the user; and a processor configured by an application module to configure the application in accordance with the non-initial configuration accessed based on the correlation between the first identifier and the second identifier.

21. The system of claim 20, wherein:

the application is a game played by the user within a user interface provided by the first social network service;

the configuration is a game state stored by the first social network service that provided the user interface within which the user played the game; and the configuring of the application includes restoring the game state of the game played by the user.

22. A method comprising:

identifying a user of a first social network based on a first identifier of the user through which an application is accessible to the user from the first social network service;

accessing a database that stores a correlation between the first identifier of the user and a second identifier of the user through which the application accessible to the user from the first social network service is accessible to the user from a second social network service;

accessing a non-initial configuration of the application, the non-initial configuration corresponding to the user and indicating a non-initial state of the application, the accessing of the non-initial configuration being based on the correlation between the first identifier of the user and the second identifier of the user; and providing the non-initial configuration to a social network system that is configured to provide the second social network service and configure the application based on the provided non-initial configuration, the providing of the non-initial configuration being performed by a processor of a machine.

23. The method of claim 22, wherein:

the application is a game played by the user through the first social network service;

the configuration is a game state stored by the first social network service through which the user played the game; and the providing of the configuration includes providing the game state of the game played by the user to the first social network system.

24. The method of claim 22 further comprising:

generating a visual representation of the application configured according to the provided configuration that is accessed based on the correlation between the first identifier of the user and the second identifier of the user; and providing a visual representation to a device of a further user.

25. The method of claim 24, wherein:

the generating of the visual representation generates a screenshot of the application configured according to the configuration accessed based on the correlation between the first identifier of the user and the second identifier of the user.

26. The method of claim 24, wherein:

the providing of the visual representation to the device of the further user is in response to a request by the user that the visual representation be communicated to a group of users inclusive of the further user.

27. The method of claim 24 further comprising:

receiving an indication of an opinion of the further user on the visual representation of the application configured according to the provided configuration that is accessed based on the correlation; and presenting the indication of the opinion with the visual representation of the application.

28. A system comprising:

a user module configured to identify a user of a first social network based on a first identifier of the user through which an application is accessible to the user from the first social network service;

a database module configured to access a database that stores a correlation between the first identifier of the user and a second identifier of the user through which the application accessible to the user from the first social network service is accessible to the user from a second social network service;

an access module configured to access a non-initial configuration of the application, the non-initial configuration corresponding to the user and indicating a non-initial state of the application, the accessing of the non-initial configuration being based on the correlation between the first identifier of the user and the second identifier of the user; and a processor configured by a provision module to provide the non-initial configuration to a social network system that is configured to provide the second social network service and configure the application based on the provided non-initial configuration.

29. A non-transitory machine-readable storage medium comprising instructions that, when executed by one or more processors of a machine, cause the machine to perform operations comprising:

identifying a user of a first social network based on a first identifier of the user through which an application is accessible to the user from the first social network service;

accessing a database that stores a correlation between the first identifier of the user and a second identifier of the user through which the application accessible to the user from the first social network service is accessible to the user from a second social network service;

accessing a non-initial configuration of the application, the non-initial configuration corresponding to the user and indicating a non-initial state of the application, the accessing of the non-initial configuration being based on the correlation between the first identifier of the user and the second identifier of the user; and providing the configuration to a social network system that is configured to provide the second social network service and configure the application based on the provided non-initial configuration, the providing of the non-initial configuration being performed by the one or more processors of the machine.

* * * * *

UNITED STATES PATENT AND TRADEMARK OFFICE
CERTIFICATE OF CORRECTION

PATENT NO. : 9,253,018 B2  
APPLICATION NO. : 13/780506  
DATED : February 2, 2016  
INVENTOR(S) : Sproule et al.

Page 1 of 1

It is certified that error appears in the above-identified patent and that said Letters Patent is hereby corrected as shown below:

On the Title Page, in item (72), in "Inventors", in column 1, line 6, after "Victoria", insert --BC--, therefor Specification In column 6, line 16, delete "at" and insert --and--, therefor Signed and Sealed this  
Twelfth Day of July, 2016

Michelle K. Lee  
*Director of the United States Patent and Trademark Office*